(12) United States Patent
Eroglu et al.

(10) Patent No.: US 8,850,788 B2
(45) Date of Patent: Oct. 7, 2014

(54) BURNER INCLUDING NON-UNIFORMLY COOLED TETRAHEDRON VORTEX GENERATORS AND METHOD FOR COOLING

(75) Inventors: Adnan Eroglu, Untersiggenthal (CH); Andrea Ciani, Zürich (CH); Johannes Buss, Hohberg (DE); Michael Düsing, Rheinfelden (DE); Urs Benz, Gipf-Oberfrick (CH)

(73) Assignee: Alstom Technology Ltd, Baden (CH)

( * ) Notice: Subject to any disclaimer, the term of this patent is extended or adjusted under 35 U.S.C. 154(b) by 436 days.

(21) Appl. No.: 12/720,890

(22) Filed: Mar. 10, 2010

(65) Prior Publication Data
US 2010/0229570 A1    Sep. 16, 2010

(30) Foreign Application Priority Data
Mar. 16, 2009    (EP) .................................... 09155235

(51) Int. Cl.
| | |
|---|---|
| *F02C 1/06* | (2006.01) |
| *F02C 1/00* | (2006.01) |
| *F02C 3/10* | (2006.01) |
| *F23R 3/16* | (2006.01) |
| *F23R 3/18* | (2006.01) |
| *F23R 3/06* | (2006.01) |
| *F02C 6/00* | (2006.01) |

(52) U.S. Cl.
CPC . *F02C 6/003* (2013.01); *F23R 3/16* (2013.01); *F23R 3/18* (2013.01); *F23R 3/06* (2013.01); *F05D 2250/21* (2013.01); *F23D 2209/20* (2013.01); *F05D 2240/127* (2013.01)
USPC ............................... 60/39.17; 60/737; 60/791

(58) Field of Classification Search
USPC ............. 60/39.17, 752–760, 806, 39.37, 737, 60/791
See application file for complete search history.

(56) References Cited

U.S. PATENT DOCUMENTS 3,990,837 A * 11/1976 Snell .............................. 60/752
5,454,220 A * 10/1995 Althaus et al. .................. 60/774
(Continued)

FOREIGN PATENT DOCUMENTS

| CN | 1117567 A | 2/1996 |
|---|---|---|
| CN | 1130718 A | 9/1996 |

(Continued)

OTHER PUBLICATIONS

European Search Report for EP Patent App. No. 09155235.6 (Aug. 14, 2009).

(Continued)

*Primary Examiner* — Gerald L Sung
(74) *Attorney, Agent, or Firm* — Buchanan Ingersoll & Rooney PC

(57) ABSTRACT

The burner (1) for a gas turbine includes a duct (2) housing a plurality of tetrahedron shaped vortex generators (3) and a lance (4) to inject a fuel to be combusted. Within the duct (2), a plurality of vortex generators (3) are provided with a plurality of holes (9) for injecting cooling air. The cooling holes (9) define passing through areas that are non-uniformly distributed on a top wall (11) of the vortex generators (3). A method for locally cooling a hot gases flow passing through a burner includes non-uniformly injecting cooling air from a vortex generator into the hot gas flow in the duct, which can reduce the occurrence of flashback in the burner.

21 Claims, 2 Drawing Sheets

(56) References Cited

U.S. PATENT DOCUMENTS

| | | | |
|---|---|---|---|
| 5,518,311 A | | 5/1996 | Althaus et al. |
| 5,735,126 A | * | 4/1998 | Schulte-Werning ............ 60/732 |
| 7,491,056 B2 | | 2/2009 | Knoepfel et al. |
| 2004/0037162 A1 | | 2/2004 | Flohr et al. |
| 2006/0099080 A1 | | 5/2006 | Lee et al. |
| 2006/0183069 A1 | | 8/2006 | Bernero et al. |
| 2007/0193216 A1 | | 8/2007 | Woolford et al. |
| 2007/0202453 A1 | | 8/2007 | Knoepfel |
| 2007/0227149 A1 | | 10/2007 | Biebel et al. |
| 2009/0013530 A1 | * | 1/2009 | Rudrapatna et al. ............ 29/888 |
| 2010/0011773 A1 | | 1/2010 | Suleiman et al. |

FOREIGN PATENT DOCUMENTS

| | | |
|---|---|---|
| CN | 1133393 A | 10/1996 |
| EP | 0619133 | 10/1994 |
| EP | 0620403 | 10/1994 |
| EP | 0718561 | 6/1996 |
| JP | 5360145 | 5/1978 |
| JP | 06307640 | 11/1994 |
| JP | 07260147 | 10/1995 |
| JP | 08226649 | 9/1996 |
| JP | 0914603 | 1/1997 |
| JP | 2006138624 | 6/2006 |
| JP | 2007218252 | 8/2007 |
| JP | 2007271256 | 10/2007 |
| JP | 2008032386 | 2/2008 |

OTHER PUBLICATIONS

Chinese First Office Action for CN Application Serial No. 201010150085.3; Date of Issue Jul. 8, 2013.
Chinese Search Report for Chinese Application Serial No. 201010150085.3; Dated Jul. 1, 2013.
English language translation of Office Action (Notification of Reasons for Refusal) issued on Dec. 16, 2013, by the Japanese Patent Office in corresponding Japanese Patent Application No. 2010-56982. (5 pages).

* cited by examiner

BURNER INCLUDING NON-UNIFORMLY COOLED TETRAHEDRON VORTEX GENERATORS AND METHOD FOR COOLING

This application claims priority under 35 U.S.C. §119 to European Application No. 09155235.6, filed 16 Mar. 2009, the entirety of which is incorporated by reference herein.

BACKGROUND

1. Field of Endeavor

The present invention relates to a burner for a gas turbine and a method for locally cooling the hot gases flow passing through a burner.

In particular the present invention relates to a sequential combustion gas turbine, i.e., a gas turbine having a compressor compressing a main air flow that is fed to a first burner; in the first burner the fuel is injected into the main air flow to form a first mixture that is then combusted in a first combustion chamber and expanded in a high pressure turbine.

Afterwards, the hot gases coming from the high pressure turbine are fed to a second burner where further fuel is injected to form a second mixture. This second mixture is then fed to a second combustion chamber where it is combusted to be then expanded in a low pressure turbine.

The present invention in particular relates to the second burner of the sequential combustion gas turbine.

2. Brief Description of the Related Art

Traditional burners have a duct containing typically four vortex generators and a lance provided with nozzles that inject the fuel.

During operation, while the hot gas flow passes through the duct, the fuel is injected such that it mixes with the hot gases to form the mixture to be combusted.

Moreover, due to the high temperature of the hot gases flowing in the duct, the walls of the duct, vortex generators, lance, etc, are provided with a plurality of small, closely-spaced, uniformly distributed holes from which cooling air is injected.

This cooling air cools the walls of the duct, vortex generators, etc, to guarantee their reliability.

In these burners (second burners of sequential combustion gas turbines) combustion is spontaneous, i.e., after a so-called ignition delay time from injection in the hot gases flow, the fuel autoignites.

In order to have a correct operation, the delay time must be long enough to let the fuel mix with the hot gases and go through the entire burner, entering the combustion chamber.

Nevertheless, in order to increase the efficiency of the gas turbines, the flame temperature in the second combustion chamber and the temperature of the hot gases coming from the high pressure turbine and entering the second burner should be increased.

This causes the delay time to be reduced and the risk for flashback to be increased.

Existing burners have a flashback margin (which within certain limits gives the possibility to decrease the ignition delay time without flashback occurring) that lets the flame and inlet temperatures be increased; nevertheless, in the zones of the core of the vortices (where the flow has a significantly lower axial velocity and thus the fuel has a longer residence time in the burner) the flashback margin is locally too low to guarantee a safe and reliable operation of the gas turbines.

SUMMARY

One of numerous aspects of the present invention relates to a burner and a method by which the aforementioned problems of the known art are addressed.

Another aspect relates to a burner and a method, which let the risk for flashback be reduced.

Another aspect relates to a burner and a method that let the flashback risk in the vortex core (in this zone the flashback risk is greater) be reduced.

Yet another aspect relates to a burner that is safe and reliable.

In particular, according to principles of the invention, cooling air is injected such that the temperature of the hot gases is locally decreased in the zones where the risk for flashback is greater (zones of the core of the vortices). This causes the ignition delay time to be locally increased, such that the fuel has more time to mix and go through the duct before autoignition occurs.

BRIEF DESCRIPTION OF THE DRAWINGS

Further characteristics and advantages of the invention will be more apparent from the description of a preferred but non-exclusive embodiment of the burner and method according to the invention, illustrated by way of non-limiting example in the accompanying drawings, in which.

DETAILED DESCRIPTION OF EXEMPLARY EMBODIMENTS

Figure 1:
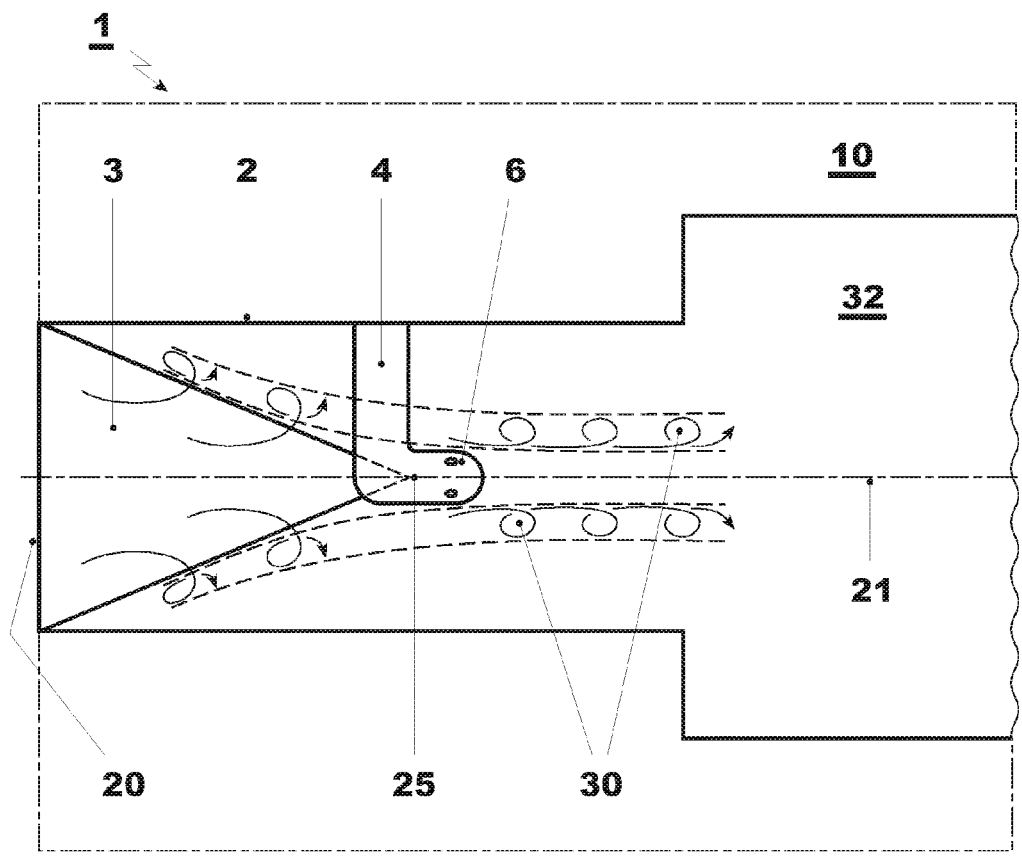
FIG. 1 is a schematic view of a burner according to the invention.

With reference to the figures, these show a burner for a gas turbine overall indicated by the reference 1. The burner is the second burner of a sequential combustion gas turbine.

The burner 1 includes a duct 2 that has a trapezoidal or rectangular cross section and houses a plurality of tetrahedron shaped vortex generators 3 and a lance 4 to inject a fuel the be combusted.

The vortex generators 3 are four in number and each of them extends from one of the walls of the duct 2; FIG. 1 only shows one vortex generator.

The lance 4 is placed downstream of the vortex generators 3 and is provided with nozzles 6 through which the fuel is injected.

The walls of the duct 2, the vortex generators 3 and the surfaces of the lance 4 are provided with a plurality of cooling holes 9 for injecting cooling air within the duct.

In fact, the duct is housed within a plenum 10 where air coming from the compressor is fed; as the air coming from the compressor has a greater pressure in the plenum 10, the air passes through the cooling holes 9 and enters the duct 2.

In particular, the cooling holes 9 are provided on the top wall 11 and side walls 12 of the vortex generators 3.

Advantageously, the cooling holes 9 define passing-through areas (i.e., areas through which the air may pass through) that are non-uniformly distributed on a top wall 11 of the vortex generators 3.

In this respect, in a first embodiment the cooling holes 9 are non-uniformly distributed on the top wall 11 of the vortex generators, such that a greater density of holes (i.e., a greater number of holes in the same surface) defines a greater passing through area.

In a different embodiment, the cooling holes 9 have a different diameter from one another, such that a greater diameter of the cooling holes 9 defines a greater passing through area.

Naturally also different embodiments are possible, such as a combination of the described embodiments.

The distribution of the passing through areas is denser in an upstream region 11a of the top wall 11 than in a downstream region 11b of the top wall 11 of the vortex generators 3 with respect to the prefixed flow direction F of the hot gases flow.

Moreover, the distribution of the passing through areas is denser at the opposite sides 11c (in the upstream region 11a) of the top wall 11 of the vortex generators 11 than in the center.

The distribution of the passing through areas is also non-uniform along the border 14 between the top wall 11 and the side walls 12 of the vortex generators 3.

The distribution of the passing through areas is denser in an upstream region 14a of the borders 14 than in a downstream region 14b of the borders 14 between the top wall 11 and the side walls 12 of the vortex generators 3 with respect to the prefixed flow direction F of the hot gases flow.

On the contrary, the distribution of the passing through areas is substantially uniform on the side walls 12 of the vortex generators and it is substantially the same as that of the downstream region 11a of the top wall 11.

Figure 4:
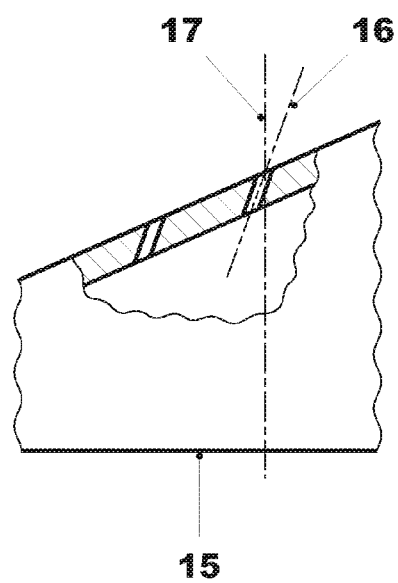
FIG. 4 in a cross section of a portion of the vortex generator according to the invention.
Figure 2:
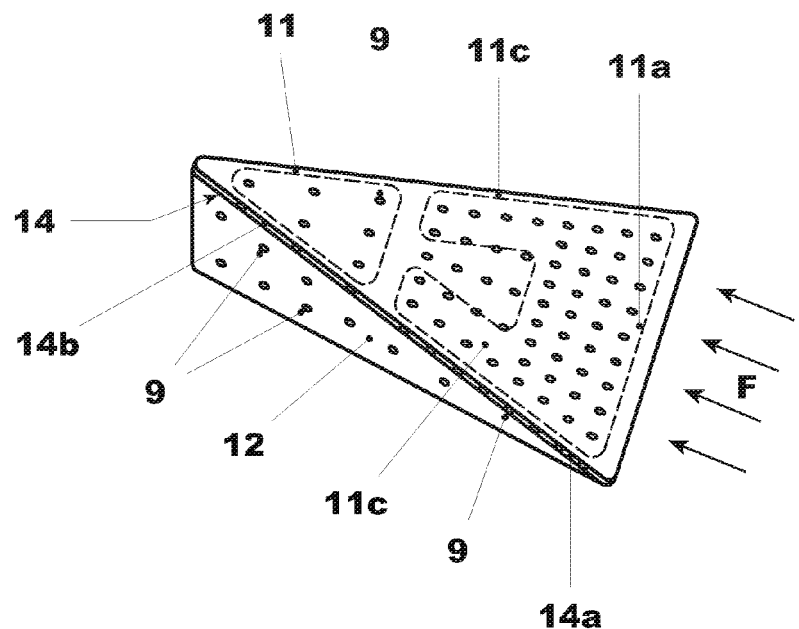
FIG. 2 is a schematic perspective view of a vortex generator according to the invention.
Figure 3:
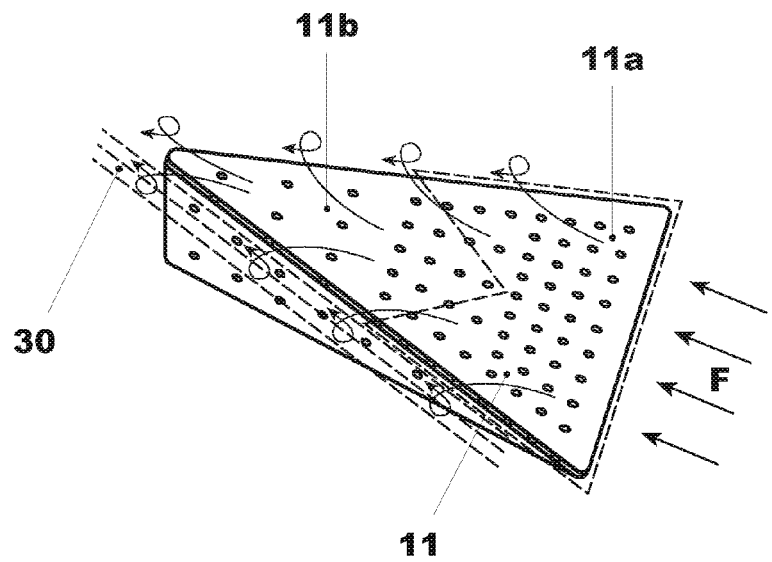
FIG. 3 is a schematic perspective view of a vortex generator and the hot gases that run along it generating vortices.

As shown in FIG. 4, the cooling holes 9 are tilted with respect to the top wall 11 and also with respect to the wall 15 of the duct 2 from which the vortex generator 3 extends.

These holes 9 have an axis 16 that is tilted by less than 50°, preferably 40-30° and more preferably about 35°, with respect to an axis 17 perpendicular to the wall 15 of the duct 2.

Moreover, each vortex generator 3 has a leading edge 20 that is substantially perpendicular to the axis 21 of the duct 2 and is located on the wall of the duct 2, and a trailing edge 25 that is substantially perpendicular to the wall of the duct 2 and is located in a plane containing the axis 21 of the duct 2 (which plane is also represented in the drawings by reference numeral 21, because it extends into and out of the plane of the view of FIG. 1).

The operation of the burner of the invention is apparent from that described and illustrated and is substantially the following.

The hot gases enter the duct 2 through the inlet and pass through the vortex generators 3 generating vortices 30 that propagate along the entire duct 2.

A flow of compressed air is diverted from the compressor and fed to the plenum 10; from the plenum this compressed air enters the duct 2 passing through the holes 9 of the duct 2, the vortex generators 3 and the lance 4 (the pressure in the plenum 10 is greater than the pressure in the duct 2).

As the passing through areas are non-uniformly distributed on the top wall 11 of the vortex generators 3, the flow of fresh compressed air injected through them cools the walls of the vortex generators and, in addition, also enter the vortices 30 up to the cores, such that the hot gases in the core of the vortices are locally cooled.

In particular, as the holes 9 at the upstream regions 11a and 14a of each vortex generator 3 define passing through areas denser than at the downstream regions 11b, 14b, the flow of fresh compressed air injected from the upstream regions 11a, 14a is greater than the flow of air injected via the holes 9 at the downstream regions 11b, 14b.

Thus the air from the upstream regions 11a, 14a cools the walls of the vortex generators and enters the vortices 30 up to the cores.

As the hot gases in the core of the vortices are locally cooled, the autoignition delay time of the fuel is locally increased, such that the fuel that after injection enters the vortices and is withheld within their cores has time enough to mix and pass through the duct 2 of the burner 1 and to enter the combustion chamber 32 without burning.

Tests showed that with the burner according to the invention the temperature within the cores of the vortices is reduced more than the case where the air would have been injected uniformly (also with increased air flow with respect to traditional burners).

The same tests also showed that there is no noticeable difference in temperature distribution at the end of the mixing zone between the cases with uniform injection and non-uniform injection of cooling air; thus no risk of increased NO emissions exists.

Preferably also the high density of passing through areas at the lance tip should be increased with respect to traditional burners, to let the wake of the lance be cooled down.

The present invention also relates to a method for locally cooling the hot gases flow passing through a burner.

The burner (that is the second burner of a sequential combustion gas turbine) has a duct 2 housing a plurality of tetrahedron shaped vortex generators 3 and a lance 4 for injecting a fuel; the vortex generators 3 are provided with a plurality of cooling holes 9 for injecting cooling air within the duct 2.

The method includes non-uniformly injecting cooling air from the cooling holes 9 on a top wall 11 of the vortex generators 3.

In particular a greater cooling air flow from an upstream region 11a of the top wall 11 is injected than from a downstream region 11b of the top wall 11 of the vortex generators 3 with respect to the prefixed flow direction F of the hot gases flow.

As shown in the figures, the greater cooling air flow is injected from the opposite sides 11c of the top wall 11 of the vortex generators 3.

In addition, cooling air is also non-uniformly injected from cooling holes 9 placed on the border 14 between the top surface 11 and the side walls 12.

In particular a greater cooling air flow is injected from an upstream region 14a of the borders 14 than from a downstream region 14b of the borders 14 between the top wall 11 and the side walls 12 of the vortex generators 3 with respect to the prefixed flow direction F of the hot gases flow.

The cooling air is injected at an angle less than 50°, preferably 40-30° and more preferably about 35°, with respect to an axis 17 perpendicular to the wall 15 of the duct 2.

The burner and the method conceived in this manner are susceptible to numerous modifications and variants, all falling within the scope of the inventive concept; moreover all details can be replaced by technically equivalent elements.

In practice the materials used and the dimensions can be chosen at will according to requirements and to the state of the art.

REFERENCE NUMBERS 1 burner
2 duct
3 vortex generators
4 lance
6 nozzles
9 cooling holes 10 plenum
11 top wall of the vortex generators
11a upstream region of the top wall 11
11b downstream region of the top wall 11
11c sides of the top wall 11
12 side walls of the vortex generators
14 border of the vortex generators
14a upstream region of the border 14
14b downstream region of the border 14
15 wall of the duct
16 axes of the cooling holes 9
17 axes perpendicular to the wall of the duct 15
20 leading edge of the vortex generators
21 axis of the duct
25 trailing edge of the vortex generators
30 vortices
32 combustion chamber
F flow direction While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A burner for a gas turbine, the burner comprising:
   a duct;
   a plurality of tetrahedron shaped vortex generators housed in said duct; and
   a lance positioned downstream of the plurality of vortex generators, the lance being configured and arranged to inject a fuel to be combusted into said duct, at least one of the plurality of vortex generators comprising a tetrahedron-shaped body including a top wall and a plurality of cooling holes configured and arranged to inject cooling air from the body into the duct;
   wherein there is a greater density of said cooling holes in at least one portion of the top wall as compared to the cooling holes in another portion of the top wall, the different densities of cooling holes define passing through areas that are non-uniformly distributed on the top wall such cores of vortices of fluid generated by the plurality of vortex generators are locally cooled such that fuel that enters the vortices after injection via the lance is withheld within the cores of the vortices and passes through the duct and into a combustion chamber without burning while mixing with fluid within the duct, the mixed fluid and fuel being fed to the combustion chamber via the duct after the lance injects the fuel into the duct such that the fuel burns after being fed into the combustion chamber.

2. A burner as claimed in claim 1, wherein the body defines upstream and downstream regions of the top wall relative to the flow direction of hot gases, and wherein the holes in the body of the tetrahedron shaped body are positioned therein such that a distribution of said passing through areas is denser in the upstream region of the top wall than in the downstream region of the top wall such that an amount of cooling air passed through the holes in the upstream region is greater than an amount of cooling air passed through the holes in the downstream region.

3. A burner as claimed in claim 1, wherein the distribution of the passing through areas is denser at opposite sides of the top wall than in the center.

4. A burner as claimed in claim 1, wherein:
   the body comprises two sidewalls adjoining the top wall at borders; and
   the distribution of the passing through areas is non-uniform along the borders between the top wall and the side walls.

5. A burner as claimed in claim 4, wherein:
   the body defines upstream and downstream regions of the borders relative to the flow direction of hot gases; and
   the distribution of the passing through areas is denser in the upstream region of the borders than that of the downstream region of the borders such that an amount of cooling air passed through the holes in the upstream region of the borders is greater than an amount of cooling air passed through the holes in the downstream region of the borders.

6. A burner as claimed in claim 1, wherein the cooling holes are non-uniformly distributed on the top wall such that an amount of cooling air passed through the holes in an upstream region of the top wall is greater than an amount of cooling air passed through the holes in a downstream region of the top wall so that the fuel enters the vortices and is withheld within the cores of the vortices so that an auto ignition time of the fuel is increased such that the fuel passes through the duct and enters a combustion chamber without burning.

7. A burner as claimed in claim 1, wherein the cooling holes have different diameters from one another.

8. A burner as claimed in claim 1, wherein the cooling holes have an axis which is tilted by less than 50° relative to an axis perpendicular to a duct wall.

9. A burner as claimed in claim 1, wherein the cooling holes have an axis which is tilted by 40-30° relative to an axis perpendicular to a duct wall.

10. A burner as claimed in claim 1, wherein the cooling holes have an axis which is tilted by 35° relative to an axis perpendicular to a duct wall.

11. A sequential combustion gas turbine comprising:
    first and second burners, the second burner positioned downstream of the first burner, wherein the second burner is a burner as claimed in claim 1;
    wherein said duct includes a wall and defines an axis along which fluid flows, said at least one of the plurality of vortex generators positioned in the duct on the wall;
    wherein said body of the at least one of the plurality of vortex generators comprises a leading edge that is substantially perpendicular to the duct axis and lays on the duct wall, and a trailing edge that is substantially perpendicular to the duct wall and lays in a plane containing the duct axis.

12. A method for locally cooling a hot gas flow passing through a burner, the method comprising:
    providing a burner according to claim 1; and
    non-uniformly injecting cooling air from the cooling holes in a top wall of the at least one vortex generator.

13. The burner of claim 1, wherein the cooling holes are positioned in the body such that the cooling air passes through the holes so that an auto ignition delay time of the fuel injected into the duct via the lance is locally increased so that the fuel, after being injected into the duct, enters the vortices and is withheld within the cores of the vortices when passing through the duct so that all the fuel passes through the duct without burning and enters into the combustion chamber before burning in the combustion chamber.

14. A method for locally cooling a hot gas flow passing through a burner, the burner including a duct housing a plurality of tetrahedron-shaped vortex generators and a lance positioned downstream of the plurality of vortex generators for injecting a fuel, wherein at least one of the plurality of vortex generators has a plurality of cooling holes for injecting cooling air into the duct, the cooling holes being positioned in a to wall of the at least one vortex generator such that there is a greater density of cooling holes in at least one portion of the to wall of the vortex generator relative to another portion of the top wall having cooling holes positioned therein, the method comprising:

non-uniformly injecting cooling air from the cooling holes in the top wall of the at least one vortex generator into the duct such that more cooling air is output from the portion of the top wall having the greater density of cooling holes as compared to the portion having a lesser density of cooling holes, the cooling air injected from the cooling holes and into the duct such that cores of vortices of fluid generated by the at least one vortex generator are locally cooled such that fuel that enters the vortices after injection via the lance is withheld within the cores of the vortices and passes through the duct and into a combustion chamber without burning while mixing with fluid within the duct;

feeding fuel within the duct via the lance to mix with fluid within the duct after the fluid has passed by the at least one vortex generator and received cooling air from the cooling holes of the at least one vortex generator, the fuel fed into the duct such that the fuel mixes with the fluid within the duct and does not burn while passing through the duct toward a combustion chamber;

feeding the fuel and fluid from the duct to the combustion chamber after the fuel is injected via the lance and the fuel is mixed with the fluid without burning, the mixed fluid and fuel being fed to the combustion chamber via the duct after the lance injects the fuel into the duct such that the fuel is unburned while in the duct and burns after being fed into the combustion chamber.

15. A method as claimed in claim 14, wherein non-uniformly injecting cooling air comprises:

injecting a greater cooling air flow from an upstream region of the top wall than from a downstream region of the top wall relative to a flow direction of the hot gas flow to locally cool the cores of the vortices such that an amount of cooling air passed through the holes in an upstream region of the top wall is greater than an amount of cooling air passed through the holes in a downstream region of the top wall so that the fuel enters the vortices and is withheld within the cores of the vortices such that an auto ignition time of the fuel is increased such that the fuel passes through the duct without burning and enters the combustion chamber to burn within the combustion chamber, the cooling holes being more densely arranged in the upstream region as compared to the downstream region.

16. A method as claimed in claim 14, wherein non-uniformly injecting cooling air comprises:

injecting a greater cooling air flow from opposite sides of the top wall than from a center of the at least one vortex generator, the cooling holes being more densely arranged in the opposite sides of the top wall as compared to cooling holes in the center of the at least one vortex generator.

17. A method as claimed in claim 14, wherein non-uniformly injecting cooling air comprises:

non-uniformly injecting cooling air from cooling holes on borders between the top wall and side walls of the at least one vortex generator.

18. A method as claimed in claim 17, wherein non-uniformly injecting cooling air comprises: injecting a greater cooling air flow from an upstream region of the borders than from a downstream region of the borders, the cooling holes being more densely positioned in the upstream region of the borders as compared to cooling holes in the downstream region of the borders.

19. A method as claimed in claim 14, wherein the duct has a wall, and wherein non-uniformly injecting cooling air comprises:

injecting said cooling air at an angle less than 50° relative to an axis perpendicular to the duct wall.

20. A method as claimed in claim 14, wherein the duct has a wall, and wherein non-uniformly injecting cooling air comprises:

injecting said cooling air at an angle 40-30° relative to an axis perpendicular to the duct wall.

21. A method as claimed in claim 14, wherein the duct has a wall, and wherein non-uniformly injecting cooling air comprises:

injecting said cooling air at an angle of 35° relative to an axis perpendicular to the duct wall.

\* \* \* \* \*